United States Patent Office 2,770,832
Patented Nov. 20, 1956

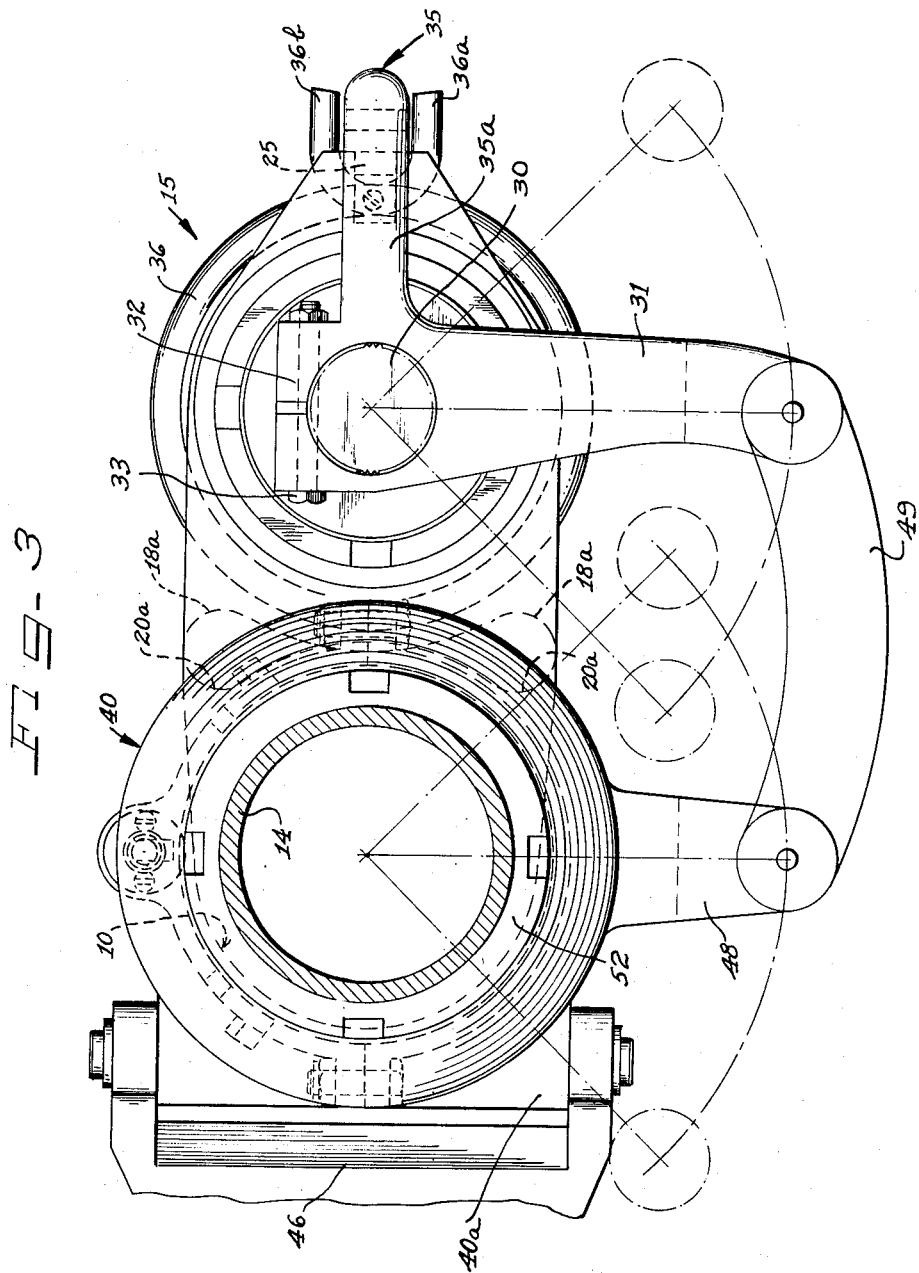

2,770,832

SWIVEL WHEEL DAMPER

Claude Martin, Buffalo, N. Y., assignor to Houdaille Industries, Inc., Detroit, Mich., a corporation of Michigan Application February 11, 1953, Serial No. 336,240

12 Claims. (Cl. 16—35)

This invention relates to improvements in shimmy damper installations especially useful for controlling the swivelly mounted caster wheel assemblies such as carried by nose struts of airplanes.

An important object of the present invention is to provide an improved shimmy damper installation which will damp vibratory or shimmy oscillations of a caster wheel assembly, within a predetermined rotational range thereof including the in-line position of the wheel and which will allow full 360° operational swiveling of the wheel with respect to the supporting strut structure.

Another object of the invention is to provide a shimmy damper installation embodying a shimmy damper, a steering unit, or a unit that functions both as a shimmy damper and steering unit, fixedly attached to a caster wheel support structure with the damping means having a restricted angular range but with means for disconnecting said damping means upon rotation of the caster wheel out of said angular range.

Still another object of the present invention is to provide a shimmy damper fixedly attached to a wheel strut, link means for transmitting damping action of said damper to the caster wheel, and means for disengaging said link means from said caster wheel during rotation of the wheel beyond the range of the shimmy damper.

It is a further object and feature of the present invention to provide a pair of collars on a wheel strut, one connected with a shimmy damper, and the other connected to the wheel the collars being interconnected within a first range of angular positions of the wheel, cam means being provided to disengage the collars during a second range of positions of the wheel.

It is a further object and feature of the present invention to provide means including a spring urged pin for interconnecting the aforesaid collars, and means for urging the damper collar to a neutral position wherein the spring urged pin is effective to interconnect the collars when the wheel returns to in line position, as during take-off of an airplane.

Other objects, features and advantages of the present invention will be readily apparent from the following detailed description of a preferred embodiment thereof taken in conjunction with the accompanying drawings, in which:

Figure 3 is a fragmentary horizontal sectional view taken substantially along the line III—III of Figure 2;

Figure 4 is a fragmentary side elevational view of a portion of Figure 2, illustrating the action of the cam means for disengaging the damper collar from the wheel collar;

Figure 5 is a view similar to Figure 4 but showing the wheel collar disengaged from the damper collar and in an undamped position; and Figure 6 is a fragmentary horizontal sectional view taken substantially on the line VI—VI of Figure 2 and illustrating the cam means for disengaging the collars in top plan.

Figure 1:
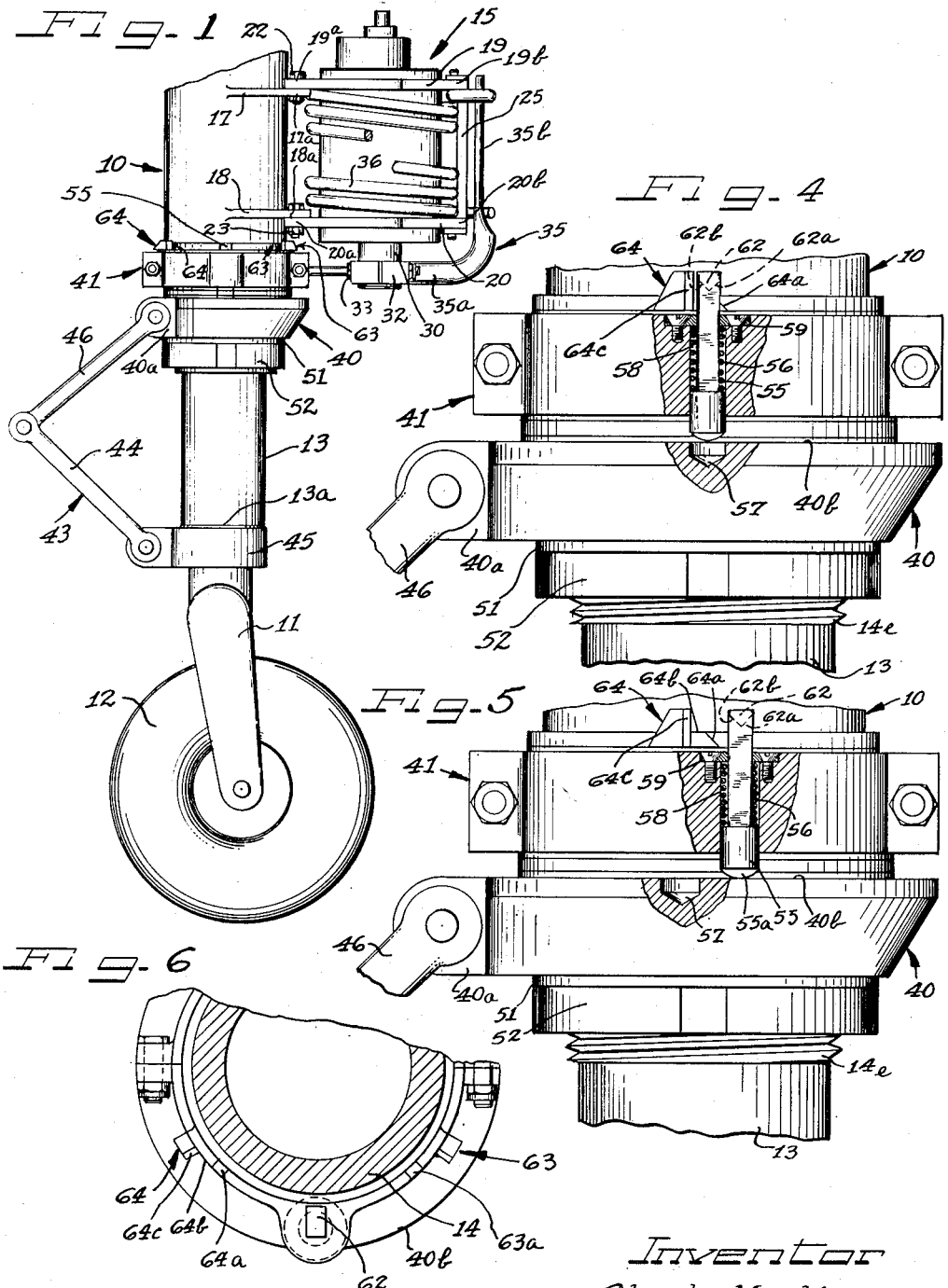
Figure 1 is a fragmentary side elevational view of a swivel-type aircraft landing gear strut structure showing the present invention applied thereto.
Figure 2:
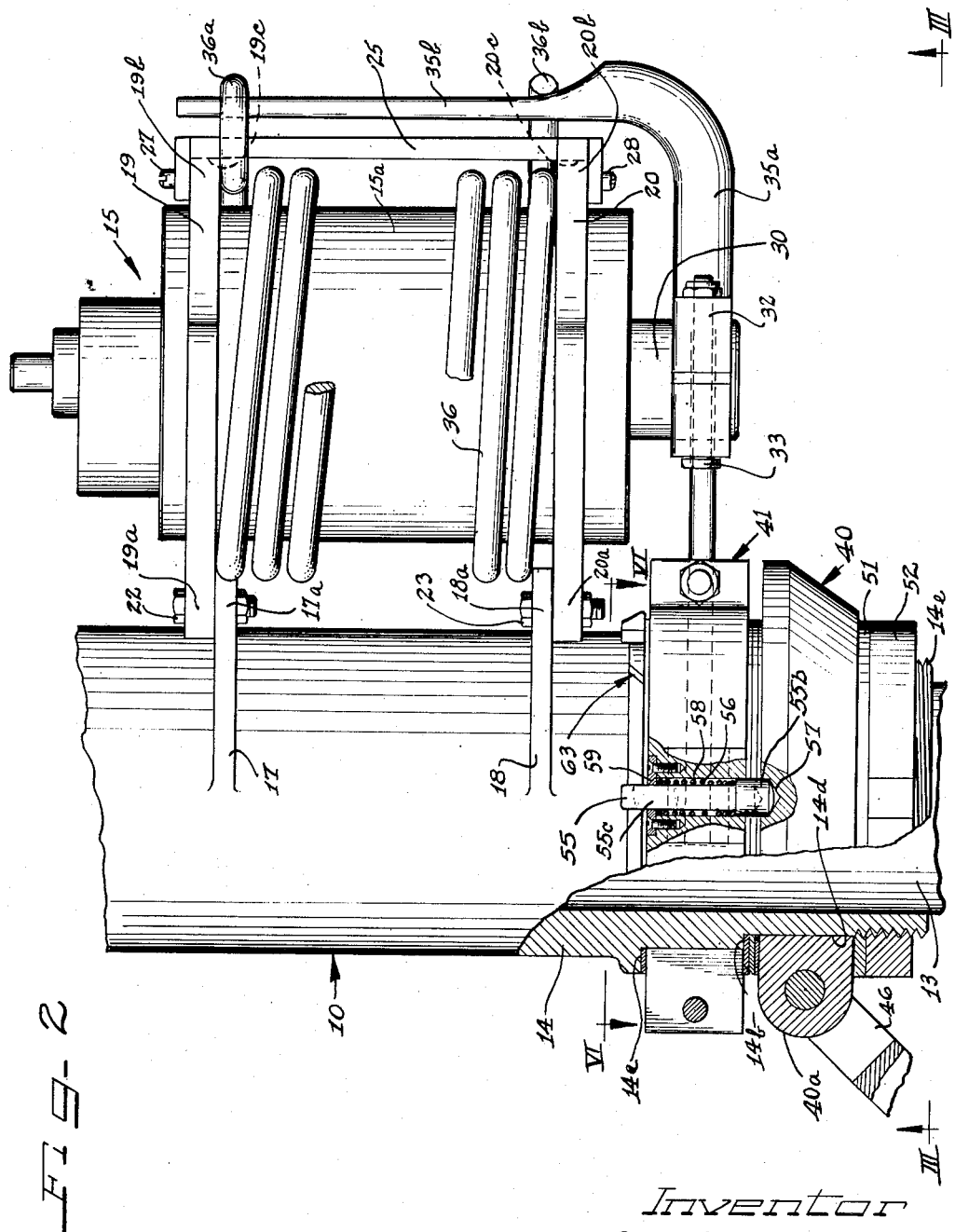
Figure 2 is an enlarged fragmentary side elevational view with certain parts broken away and in sections of a portion of the structure of Figure 1.

In a swivelling or caster-type aircraft landing wheel assembly such as shown in Figure 1, the carriage includes an oleo strut assembly comprising a strut 10 attached non-rotatably to the aircraft (not shown) and a swivel leg or wheel yoke 11 which carries a wheel 12. A swivel connection between the yoke 11 and the strut proper 10 is affected by means of an upwardly projecting cylinder 13 which is rotatably and vertically reciprocably engaged in a tubular casing 14 (Figure 2).

For damping shimmy in the wheel-supporting gear including the yoke 11 and wheel 12, a shimmy damper assembly 15 is provided, which may be of the rotary piston or vane, hydraulic fluid displacement type and have a restricted angular travel of, for example, 120°. It will be understood that the term damper as used in the specification and claims is intended to comprehend any shimmy damper, steering unit or unit that functions both as a shimmy damper and steering unit. The present invention has particular application where the damper is applied to a strut that requires full swivelling through 360° of the wheel.

The damper 15 is mounted by means of brackets 17 and 18 carried by the strut, the brackets having ears 17a and 18a, for overlapping with ears 19a and 20a of mounting flanges 19 and 20. Bolts 22 and 23 secure the overlapping ears for supporting the damper 15 from the strut 10. A connecting strap or bar 25 extends between the flanges 19 and 20 and is fastened at its ends to flanges 19b and 20b of the flanges 19 and 20 by means of screws 27 and 28. The flanges are provided with notches 19c and 20c for receiving the bar 25 to rigidly position the same with the flanges.

The damper 15 is effective to resist rapid or fairly high frequency oscillations or changes in the angular position of a shaft 30, depending from the damper 15. As best seen in Figure 3, the shaft 30 is provided with an actuating arm 31 secured thereto as by means of a split collar 32 and bolt 33. The arm 31 is provided with an extension 35 having a portion 35a thereof extending generally radially from the shaft 30 and a portion 35b extending upwardly generally parallel to the axis of the damper 15.

For centering the shaft 30 in a neutral position, a preloaded torsion spring 36 is wrapped about the damper housing 15a as shown in Figure 2 and has out-turned opposite ends 36a and 36b extending on either side of the extension portion 35b. Thus, if the lever 31 is displaced from the neutral position, spring 36 acting on the extension 35 will force the lever 31 to return to the neutral position, as soon as the torque applied to the lever 31 becomes less than the centering torque developed by the spring 36. It will be observed that the ends 36a, 36b of the spring 36 also engage around the bar 25, so that as the extension 35 displaces one end of the spring 36 in a given direction, the opposite end of the spring is retained by the bar 25.

For damping shimmy in the wheel-supporting gear including the yoke 11, the yoke is operatively connected to the damper lever 31 through the medium of a pair of torque collars 40 and 41 rotatably carried on the strut tubular casing 14, Figure 2. During rotation of the wheel 12 within the operative range of the damper, these torque collars 40 and 41 act as a single piece. Torque is transmitted from the fork 11 to the lower collar 40 by means of torque scissors 43, Figure 1, having a lower link 44 connected at its lower end to a sleeve 45 fixed against a shoulder 13a of the cylinder 13, while an upper link 46 is connected to a boss 40a of the collar 40. The upper collar 41 has an integral lever 48, Figure 3. The free end of the lever 48 is connected by means of a link 49 to the lever 31 of the damper 15.

As seen in Figure 2, the collar 41 is bottomed against a shoulder 14a of the casing 14 and a thrust shoulder 14b is interposed between the collars 40 and 41 to avoid transmission of torque from the collar 40 to the collar 41 by means of friction. The collar 40 is retained on a reduced diameter portion 14d of the casing 14 by means of a washer 51 and a nut 52 which is in threaded engagement with a portion 14e of the casing.

As shown in Figure 2, the collars 40 and 41 are interlocked to rotate together within the range of the damper 15 by means of a locking pin 55 having a plunger 55b which is urged by means of spring 56 into a recess 57 provided by the lower collar 40. The pin 55 and spring 56 are carried within a bore 58 extending through the collar 41, the upper end of the bore being closed by a plate 59 which has a non-circular opening for guiding the non-circular shank 55c of the pin and which bottoms the upper end of the spring 56.

In order to permit full 360° swivelling of the wheel with the damper effective for 60° on either side of its neutral position, means are provided for disengaging the locking pin 55 from the recess 57 during rotation of the wheel beyond the range of the damper 15. Such means include a lateral head lug 62 at the upper end of the pin 55 (Figure 6), for cooperation with a pair of cam members 63 and 64. As indicated in Figures 4 and 5, the lug 62 has a pair of inclined cam faces 62a and 62b for cooperation with inclined cam faces 63a and 64a, Figures 4-6. The cam members 63 and 64 are fixedly carried by the strut 10, and are disposed at 60° on either side of the neutral position of the collar 41.

As shown in Figure 4, when the wheel and collar 40 have turned through 60° to the left from neutral position, the collar 41 turning with the collar 40 moves the head lug 62 against cam 64, the surface 62b of lug 62 riding up the cam face 64a. Thus the lug 62 of pin 55 is temporarily supported on the horizontal face 64b of the cam member 64. The portion 64c of the cam member opposes the lug 62 and prevents further leftward movement of the locking pin. However, as soon as the collars 40 and 41 are disengaged, the torsion spring 36 is effective to return the collar 41 to its neutral position. As the lock pin 55 is moved off the cam 64 by the spring 36, the rounded lower end 55a of the pin 55 rides on the upper surface 40b of the collar 40. Collar 40 being disconnected from collar 41 is free to rotate 360°. Collars 40 and 41 will engage again when collar 40 rotates to the neutral position. This will insure that an airplane would never take off without collars 40 and 41 being connected.

If the wheel should begin its rotation in the opposite direction so that the cam 63 is operative to disengage the lock pin 55 from the collar 40, it is apparent that the operation is entirely similar and that as soon as the locking pin 55 is disengaged it will be returned to neutral position by the spring 36 acting through the extension 35.

It will be understood that modifications and variations may be effected without departing from the scope of the novel concepts of the present invention.

I claim as my invention:

1. A shimmy damper installation for damping oscillations of a wheel assembly mounted in a relatively fixed support structure comprising, in combination, damping means attached to the support structure, first collar means journaled on said support structure, means operatively connecting said damping means with said collar means, second collar means journaled on said support structure and connected to oscillate with said wheel assembly, means for interconnecting said first and second collar means for joint movement within a preselected range of positions of said wheel assembly to damp oscillations of said wheel assembly, and means for disengaging said interconnecting means outside the preselected range of positions of said wheel assembly to disconnect said damping means from said wheel assembly.

2. A shimmy damper installation for damping oscillations of a wheel assembly mounted in a relatively fixed support structure comprising, in combination, damping means attached to the support structure, first collar means journaled on said support structure, means operatively connecting said damping means with said first collar means, second collar means journaled on said support structure and connected to oscillate with said wheel assembly, means for interconnecting said first and second collar means for joint movement to damp oscillations of said wheel structure, means for disengaging said interconnecting means outside a preselected range of positions of said wheel assembly to disconnect said damping means from said wheel assembly, and means for centering said first collar means at a preselected position in said preselected range when disconnected from said second collar means.

3. A shimmy damper installation for damping oscillations of a wheel assembly mounted in a relatively fixed support structure comprising, in combination, damping means attached to the support structure, first collar means journaled on said support structure, means operatively connecting said damping means with said first collar means, second collar means journaled on said support structure and connected to oscillate with said wheel assembly, means for interconnecting said first and second collar means for joint movement to damp oscillations of said wheel structure, said interconnecting means including a spring urged pin carried by one of said collar means and a cooperating recess in the other of said collar means, and means for disengaging said interconnecting means outside a preselected range of positions of said wheel assembly to disconnect said damping means from said wheel assembly, said disengaging means including a cam carried by said support structure for retracting said pin from said recess.

4. A shimmy damper installation for damping oscillations of a wheel assembly mounted in a relatively fixed support structure comprising, in combination, damping means attached to the support structure, a damping arm operatively connected to the damping means, first collar means journaled on said support structure, means connecting said damping arm with said collar means, second collar means journaled on said support structure and connected to oscillate with said wheel assembly, means for interconnecting said first and second collar means for joint movement to damp oscillations of said wheel structure, and means for disengaging said interconnecting means outside a preselected range of positions of said wheel assembly to disconnect said damping means from said wheel assembly, torsion spring means associated with said damping means, and an extension on said damping arm for engagement with the opposite ends of said spring means to resist movement of said arm in either direction from a neutral position.

5. A shimmy damper installation for damping oscillations of a wheel assembly, comprising a relatively fixed tubular support, a first torque collar journalled on said support, a second collar journalled on said support, a locking pin carried by said first collar, means urging said pin toward said second collar, said second collar having a recess for receiving said pin when aligned therewith and having an annular surface on which said pin will ride when not in said recess, damping means operatively connected to said first collar and having a restricted angular range, means for connecting said second collar to said wheel assembly for damping oscillations thereof when said pin is in said recess, said pin having means providing cam faces associated therewith, and cam means carried on the periphery of said support and disposed to engage said cam faces to retract said pin from said recess at the opposite ends of the range of said damping means to afford full swivelling of the wheel assembly.

6. A shimmy damper installation for damping oscillations of a wheel assembly, comprising a relatively fixed tubular support having a first shoulder, a first torque collar journalled on said support adjacent said first shoulder, said support having a second shoulder spaced from said first shoulder a distance greater than the width of said first collar, a second collar journalled on said support and spaced from said first collar by said second shoulder to avoid appreciable friction between said collars, a locking pin carried by said first collar, means urging said pin toward said second collar, said second collar having a recess for receiving said pin when aligned therewith and having an annular surface on which said pin will ride when not in said recess, damping means operatively connected to said first collar and having a restricted angular range, means for connecting said second collar to said wheel assembly for damping oscillations thereof when said pin is in said recess, means urging said first collar into a neutral position, said pin having means associated therewith providing cam faces, and cam means carried on the periphery of said support and disposed to engage said cam faces to retract said pin from said recess at the opposite ends of the range of said damping means to afford full swivelling of the wheel assembly, said first collar thereafter being returned to its neutral position by said collar urging means.

7. Means for transmitting torque within a preselected range, comprising a relatively fixed support structure, first and second torque transmitting means carried by said support structure and arcuately movable relative thereto, control means operably carried by said support structure and connected with said first torque transmitting means for controlling arcuate movement of said first torque transmitting means relative to said support structure, connector means carried by said first torque transmitting means, cooperating means carried by said second torque transmitting means and operative to engage said connector means to interconnect said first and second torque transmitting means for joint movement within said preselected range, means connected with said connector means providing oppositely directed cam faces, and a pair of cam means carried by said support structure in arcuately spaced relation to define the opposite extremes of said preselected range of joint movement of said first and second torque transmitting means, said cam means each being disposed for engagement with a respective one of said oppositely directed cam faces to disengage said connector means from said cooperating means upon movement of one of said torque transmitting means outside said preselected range.

8. A shimmy damper installation comprising, in combination a relatively fixed support structure, a wheel assembly carried by said support structure and angularly movable relative thereto, damping means carried by said support structure, first torque transmitting means operatively connected to said damping means and angularly movable relative to said support structure under the control of said damping means, second torque transmitting means operatively connected to said wheel assembly for angular movement therewith, means for interconnecting said first and second torque transmitting means for joint movement within a preselected range of positions of said wheel assembly to damp oscillations of said wheel assembly, and automatically operable means for automatically disengaging said interconnecting means outside the preselected range of positions of said wheel assembly to disconnect said damping means from said wheel assembly.

9. A shimmy damper installation for damping oscillation of a wheel assembly, comprising in combination, a relatively fixed support structure, damping means carried by said support structure, first torque transmitting means carried by said support structure and arcuately movable relative thereto, second torque transmitting means carried on said support structure for arcuate movement relative thereto about a common axis with said first torque transmitting means and connected to oscillate with said wheel assembly, cooperating connector means carried by said first and second torque transmitting means and operative to interconnect first and second torque transmitting means for joint movement within a preselected range of positions of said wheel assembly to damp oscillations of said wheel assembly, and automatically operable disengagement means carried by said support structure and having portions thereof disposed in arcuately spaced relation to define the preselected range of positions of the wheel assembly and automatically operative to disengage said cooperating connector means outside the preselected range of positions of said wheel assembly to disconnect said damping means from said wheel assembly.

10. A shimmy damper installation, comprising, in combination, a relatively fixed support structure, a wheel assembly carried by said support structure for arcuate movement relative thereto, damping means connected to said support structure, first collar means operatively connected to said damping means and mounted for arcuate movement relative to said support structure, second collar means operatively connected to said wheel assembly for arcuate movement therewith and mounted for arcuate movement about a common axis with said first collar means, means for interconnecting said first and second collar means for joint movement within a preselected range of positions of said wheel assembly to damp oscillations of said wheel assembly, and automatically operable means connected to said support structure and angularly fixed with respect thereto for automatically disengaging said interconnecting means outside the preselected range of positions of said wheel assembly to disconnect said damping means from said wheel assembly.

11. A wheel control assembly comprising in combination, a relatively fixed support structure, a wheel assembly carried by said support structure and arcuately movable relative thereto, control means connected to said support structure, first torque transmitting means operatively connected to said control means and mounted for arcuate movement relative to said support structure under the control of said control means, second torque transmitting means operatively connected to said wheel assembly for arcuate movement therewith, means for interconnecting said first and second torque transmitting means for joint movement within a preselected range of positions of said wheel assembly, said interconnecting means comprising an axially reciprocal pin carried on one of said torque transmitting means and a recess extending axially in the other of said torque transmitting means for receiving said pin to interlock said first and second torque transmitting means, and automatically operable disengagement means connected to said support structure in fixed angular relation with respect thereto and having portions disposed in arcuately spaced relation to define the preselected range, said portions being automatically operative to axially retract said pin from said recess to disengage said pin and recess outside the preselected range of positions of the wheel assembly to disconnect said control means from said wheel assembly.

12. A shimmy damper installation comprising, in combination, a relatively fixed support structure, a wheel assembly carried by said support structure and arcuately movable relative thereto, damping means connected to said support structure, first torque transmitting means operatively connected to said damping means and mounted for arcuate movement relative to said support structure, second torque transmitting means operatively connected to said wheel assembly for arcuate movement therewith, means for interconnecting said first and second torque transmitting means for joint movement within a preselected range of positions of said wheel assembly to damp oscillations of said wheel assembly, automatically operable disengagement means connected to said support structure in fixed angular relation with respect thereto and automatically operative to disengage said interconnecting means outside the preselected range of positions of the wheel assembly to disconnect said damping means from said wheel assembly, and automatically and continuously operating biasing means acting to center said first torque transmitting means at a preselected position in said preselected range when disconnected from said second torque transmitting means.

References Cited in the file of this patent

UNITED STATES PATENTS

| | | |
|---|---|---|
| 2,143,271 | Jay | Jan. 10, 1939 |
| 2,275,372 | Mogrum | Mar. 3, 1942 |
| 2,348,974 | Hadekel et al. | May 16, 1944 |
| 2,424,233 | Greenough | July 22, 1947 |
| 2,572,589 | Bishop | Oct. 23, 1951 |